United States Patent [19]

Georgi et al.

[11] Patent Number: 5,491,638

[45] Date of Patent: Feb. 13, 1996

[54] METHOD OF CONTROLLING A COORDINATE MEASURING APPARATUS

[75] Inventors: Bernd Georgi, Oberkochen; Bernd Czepan, Heidenheim; Heinz Peter, Ulm, all of Germany

[73] Assignee: Carl-Zeiss-Stiftung, Heidenheim, Germany

[21] Appl. No.: 329,302

[22] Filed: Oct. 26, 1994

[30] Foreign Application Priority Data

Oct. 28, 1993 [DE] Germany ............................ 43 36 863.8

[51] Int. Cl.$^6$ ............................ G01B 21/04; G05B 19/401
[52] U.S. Cl. ........................... 364/474.37; 364/474.2; 364/560
[58] Field of Search ................... 364/560, 474.2, 364/474.35, 474.34, 474.37, 167.01, 184, 191, 192, 461, 474.03, 474.32, 474.19, 474.25, 474.26, 474.24; 33/503–505; 395/90; 318/568.1, 563

[56] References Cited

U.S. PATENT DOCUMENTS

| | | | |
|---|---|---|---|
| 4,604,705 | 8/1986 | Imanishi | 364/474.32 |
| 4,835,718 | 5/1989 | Breyer et al. | 364/560 |
| 4,998,196 | 3/1991 | Seki et al. | 364/191 |

Primary Examiner—Roy N. Envall, Jr.
Assistant Examiner—Steven R. Garland
Attorney, Agent, or Firm—Walter Ottesen

[57] ABSTRACT

The invention is directed to a method for automatically generating travel paths to the next geometric elements to be measured when there is a collision of the probe 25 or the probe head 10, for example, with the workpiece 22. The method utilizes safety-reference surfaces (S1 to S5) placed in the form of an enclosing parallelepiped about the workpiece 22. The shortest collision-free connecting paths (P1-P2-P3) from one geometric element to the next are computed on these safety-reference surfaces.

7 Claims, 5 Drawing Sheets

METHOD OF CONTROLLING A COORDINATE MEASURING APPARATUS

FIELD OF THE INVENTION

The invention relates to a method of controlling a coordinate measuring apparatus having a device for handling faults. This device interrupts the automatic measuring sequence in the case of a disturbance and then continues the measuring sequence in a modified form.

BACKGROUND OF THE INVENTION

A method of the kind referred to above is, for example, disclosed in U.S. Pat. No. 4 835,718.

The known control method provides that safety-reference positions in the form of points are defined before the start of the actual measuring program. These safety-reference positions lie on the path pregiven for the probe head or contact ball. In the case of a disturbance, the probe can be moved back to these points or along these points. These safety-reference positions, that is, the coordinates of the points concerned must be made part of the control data when programming an automatic measuring sequence. For this reason, the method is relatively complex to program and corresponding preparatory time is needed to prepare the automatic sequence. Furthermore, little flexibility is provided because the safety-reference positions or their point coordinates are fixed for the particular workpiece.

However, there is often the desire to not measure workpieces completely; instead, only specific features or geometric elements on the workpiece are measured either because the other features are not sufficiently important for the measuring task concerned or measuring time is to be reduced or both. For such a feature-referred measurement only specific portions of the CNC sequence are selectively processed and for this measurement the known method is not well suited. This is so because in the course of a measurement referred to specific features, a control module automatically generates the travel path between the geometric elements which are to be contacted specifically for the measuring task according to pregiven criteria. Fixed pregiven safety-reference positions on the workpiece are therefore only poorly compatible with this control method.

SUMMARY OF THE INVENTION

It is an object of the invention to provide a control method of the kind referred to above that is also especially well adapted to making flexible, feature-referred measurements on the workpiece.

The method of the invention is for controlling a coordinate measuring apparatus for making measurements on a workpiece utilizing a probe. The workpiece has a plurality of geometric elements on first and second sides thereof and the apparatus has a fault-handling device for interrupting the measuring sequence in the case of a disturbance and for resuming the measurement sequence in a modified form. The method includes the steps of: coupling a control module to the fault-handling device; placing predefined safety-reference surfaces about the workpiece; automatically generating a travel path with the control module for the probe between the geometric elements utilizing the safety-reference surfaces; and, at least always automatically computing in the control module collision-free connecting paths on the safety-reference surfaces from one geometric element on the first side to a next one of the geometric elements when the next geometric element is on the second side of the workpiece.

The complexity of programming and especially the preparatory time for the measurement of a workpiece is considerably reduced because the method of the invention does not provide for fixed safety-reference positions. In lieu thereof, only several safety-reference surfaces are to be defined which enclose or surround the workpiece. These surfaces are mathematical or imaginary surfaces and can have particular forms as required, for example, because of the shape of the workpieces to be measured. In the case of a disturbance, the probe head, that is, the probe ball is moved to these surfaces and a control module automatically generates the travel path within the safety-reference surfaces to the next geometric element which is to be measured in the context of the measuring task.

This part of the control method is anyway provided for the feature-referred measurement and can therefore also be used in the case of a collision and does not have to be separately generated for this case. Furthermore, the new method is more reliable in the workplace because it is significantly simpler to manipulate. No specially trained personnel are needed to program the safety-reference positions; instead, regular measuring technicians not having system manager knowledge can activate the control method.

The pregiven criteria pursuant to which the transfer or changeover of the probe from one safety-reference surface to the next (for example, on the other side of the workpiece) takes place advantageously contains connecting lines or connecting points which can be inputted when the control program is prepared or also can be generated automatically. For example, the connecting lines can be intersect lines of two mutually adjacent safety-reference surfaces.

It is furthermore advantageous to provide intermediate positions between the safety-reference surfaces and the contact points on the geometric elements to be measured. The intermediate points are assigned to the geometric element concerned. In this way, in the case of a collision, the control can move the probe within a geometric element on a clear, specific, collision-free path back to the corresponding safety-reference surface or, if required, when the next geometric element to be measured is on the same side of the workpiece, then the control can move the probe to the next intermediate point on this geometric element. In the last case, it is a condition precedent that the path between the intermediate points is already defined as being collision free.

According to another feature of the invention, the safety-reference surfaces are planes within which the travel path can automatically be generated in a simple manner by the control module concerned. These safety-reference planes can likewise either be defined by the user or, for example, they can be generated interactively via a corresponding program module in that this program module positions the safety-reference planes in correspondence to the geometry of the workpiece to be measured at a specific minimal distance above or forward of the workpiece and the operator thereafter either accepts this suggestion or changes the position of the safety-reference planes.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
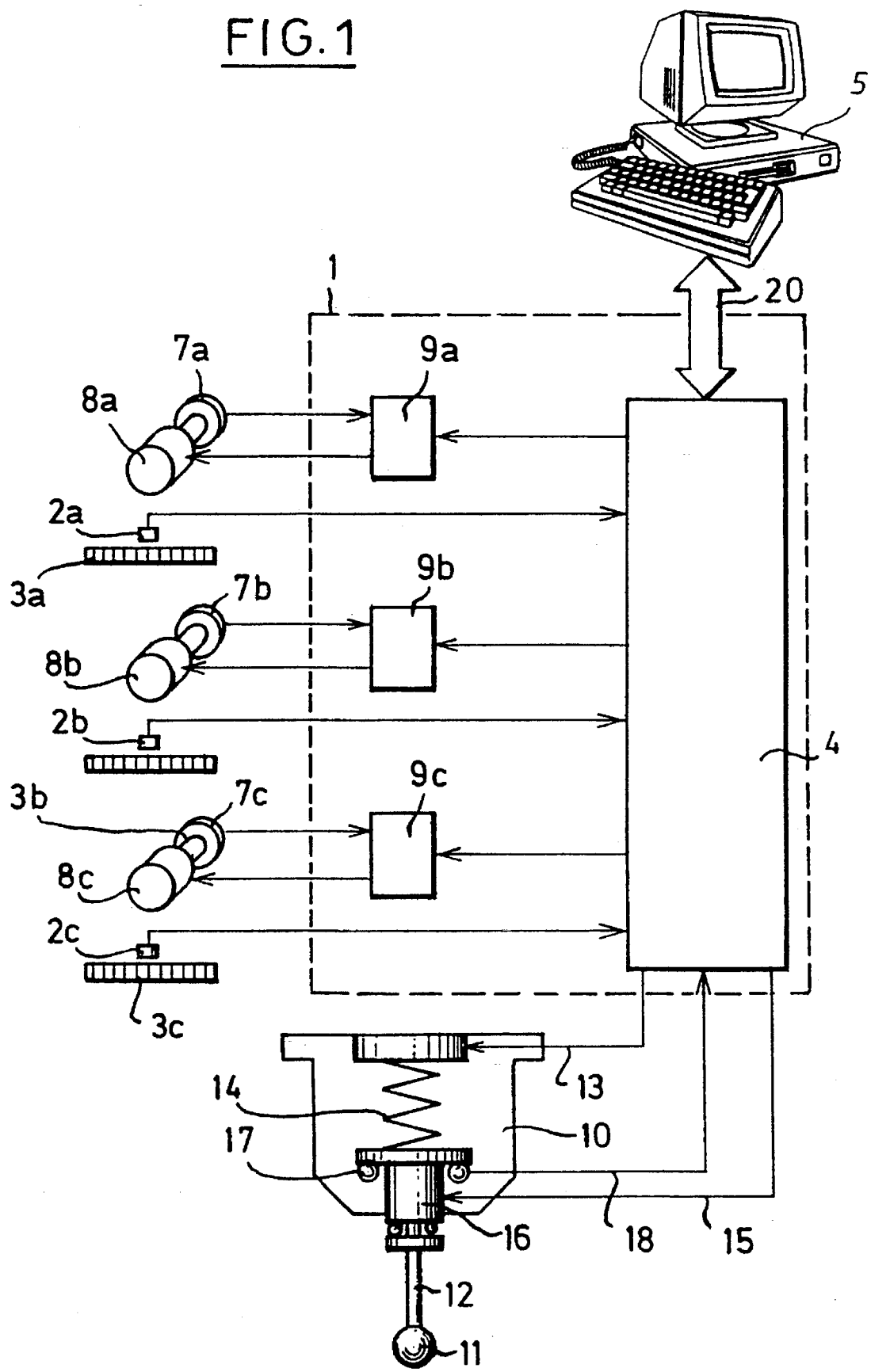
FIG. 1 is a block circuit diagram of the components necessary for controlling a coordinate measuring apparatus.

In FIG. 1, reference numeral 1 identifies the control electronics of the coordinate measuring apparatus. The main component of the control electronics 1 is the control unit 4 comprising microprocessors. The control unit 4 is connected via a data bus 20 to a computer 5 which can be programmed by the user. The control unit 4 receives from the computer the position and process data for the measuring program to be executed. From the data received from the computer, the control unit 4 computes, inter alia, the velocity desired values $V_x$, $V_y$ and $V_z$ for the velocity closed-loop control circuits of the drives of the apparatus in the three measuring axes along which movement takes place. These control circuits each include a drive motor 8 having a tachogenerator 7 mounted thereon and the power electronics 9 which close the control loop. The probe head is identified in FIG. 1 by reference numeral 10 and is moved by the motors (8a to 8c) to the measuring positions fixed in the computer 5.

The position of the probe head 10 is measured in the machine coordinate system with the measurement scales assigned to the three measurement axes X, Y and Z. For this purpose, signal transducers (2a to 2c) are likewise connected to the control unit 4 and are part of a separate position control loop. The signal transducers (2a to 2c) function to read off the measurement scales.

The switching contact 17 in the bearing of the probe pin 12 is connected to the control unit 4 via the line 18 for detecting the actual measurement values during the contact operation. The switching contact 17 supplies the contact pulse or a coincidence identification which verifies the contact pulse of a sensitive piezo sensor in the probe pin 12. The control unit 4 stores the coordinate values of the measuring scales (3a to 3c) measured at the instant of the contact and transmits this data as a measuring result to the computer 5.

The control unit 4 is connected via further lines to the probe head 10. The electromagnet 16, which belongs to the probe pin changing unit, can be energized by the control unit 4 via line 15. The line 13 permits a device represented by the spring 14 to be driven to adjust the compliant preloading of the probe pin 12.

Figure 2:
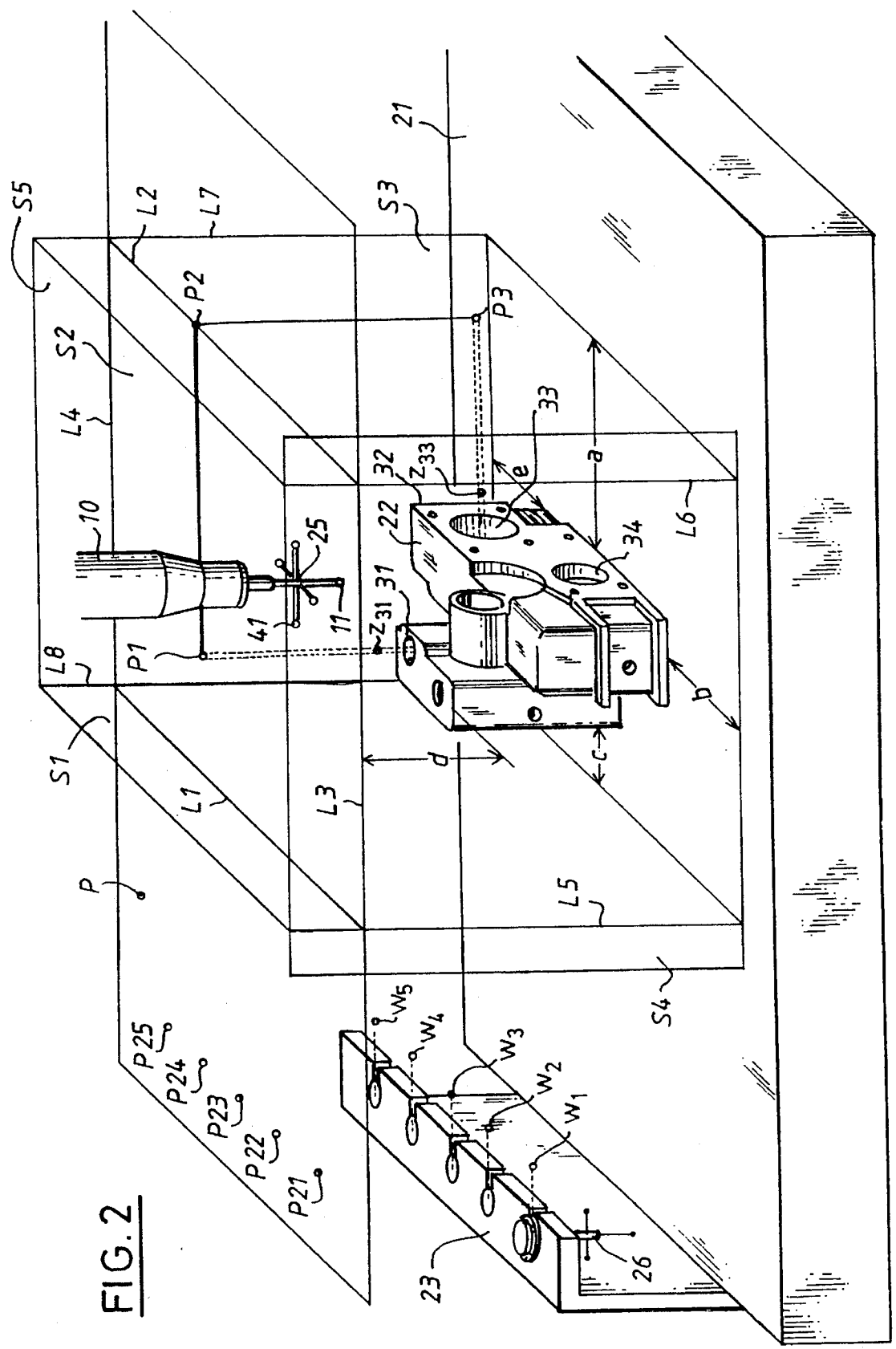
FIG. 2 is a simplified perspective sketch wherein the safety-reference planes are shown placed about a workpiece.

In FIG. 2, the measuring table 21 of the coordinate measuring apparatus is shown with the workpiece 22 to be measured. The probe head 10 is disposed over the workpiece 22 and can be moved by the drive motors (8a to 8c) in the three coordinate directions (X, Y, Z). The probe head carries a star probe 25 for the measuring tasks to be executed on workpiece 22.

A magazine 23 is mounted on the measuring table 21 at the edge of the measuring region. Various probes and probe configurations assembled for the particular measuring tasks are placed in the magazine. If another probe is needed in the course of the measuring tasks, then the probe head 10 is moved by the drives to one of the exchange positions W1 to W5 associated with the magazine 23 wherein a probe is exchanged for another probe needed in the next measuring task. This exchange is performed in a movement sequence which will be explained.

The control method described below is so arranged that several feature-referred measuring tasks can be carried out on the workpiece 22. For each measuring task, one or several geometric elements, which are to be contacted for the particular measuring task, are driven to. For example, in one measuring task, the position and alignment of the bore 31 to the surface 32 is to be determined or, in another measuring task, the distance of the two bores 33 and 34 from each other is to be determined. The user can define these measuring tasks interactively with the aid of suitable software implemented on the computer 5.

Part of this software is a module which automatically generates the travel path between the geometric elements (31 to 34) which are to be contacted in the context of the measuring task pursuant to pregiven criteria. For example, if the distance between the axes of the bores 33 and 34 is to be determined, each of the two bores 33 and 34 must be contacted at several points along their inner periphery. That is, the probe is first moved from a pregiven park position P at the edge of the measuring region to bore 33 and then to bore 34. Each time, the required number of contact operations takes place and, thereafter, the probe is moved back into its start position.

The control method of the invention does not require the operator to pregive individual points or to program the path to the individual geometric elements such as the bores 33 and 34. Instead, the probe is moved by the program module along a travel path which the module automatically generates. The module does this from the known geometric data of the workpiece type and from the coordinates which define the position of the workpiece on the measuring table 21.

Safety-reference surfaces are defined for the workpiece 22 and the probe 25 so that the automatically generated travel path does not lead to collisions with the workpiece or other objects in the measuring region of the coordinate measuring apparatus. These safety-reference surfaces are planar surfaces S1 to S5 on which the probe head can be freely moved. The planar surfaces S1 to S5 are placed in the form of a box around the workpiece 22 in the embodiment described. The lines at which these surfaces intersect are identified by L1 to L8.

The distances (a to e) of the safety-reference surfaces S1 to S5 from the corresponding surfaces of the workpiece 22 are so selected that the probe balls (11, 41) of the probe 25 as well as the probe head 10 itself do not touch the workpiece when moving on the surfaces (S1 to S5). The corresponding distances (a to e) to the workpiece can be suggested also by the program and thereafter either be confirmed by the operator or can be substituted by other distances, for example, when a clamping device still projects into the measuring region. These distances are dependent, as mentioned, on the geometry of the workpiece to be measured. These distances define a parallelepipedly-shaped region around the workpiece into which the probe balls of the probe 25, which has been newly mounted in the probe head 10, can only plunge when moving to the geometric element to be measured but not in the course of the automatically generated travel path from one geometric element to another geometric element. When generating this box-like enclosing parallelepiped made up of safety-reference surfaces, the program is orientated to intermediate positions of the geometric elements of the workpiece which are farthest away. Their significance is explained with respect to FIGS. 3 and 4.

As mentioned, the control module of the measurement software automatically generates the path along the safety-reference surfaces S1 to S5 pursuant to pregiven criteria. The criterion can, for example, be the shortest path from a position P1 on the safety-reference surface S2 above the bore 31 to a position P3 above the bore 33 on the safety-reference surface S3. On this path, the probe head changes over at the intersect line L2 from the safety-reference surface S2 to the safety-reference surface S3. The computation of the travel path from the position P1 to the position P3 can take place in this case in that first the intersect line L12 is driven to in a direction perpendicularly from the position P1. The intersect line L2 defines the crossover to safety-reference surface S3. In this way, the probe reaches the position P2 on the intersect line L2. From there, the probe then moves along the shortest path on the safety-reference surface S3 to a point P3 above the next geometric element (the bore 33) to be measured.

Figure 3:
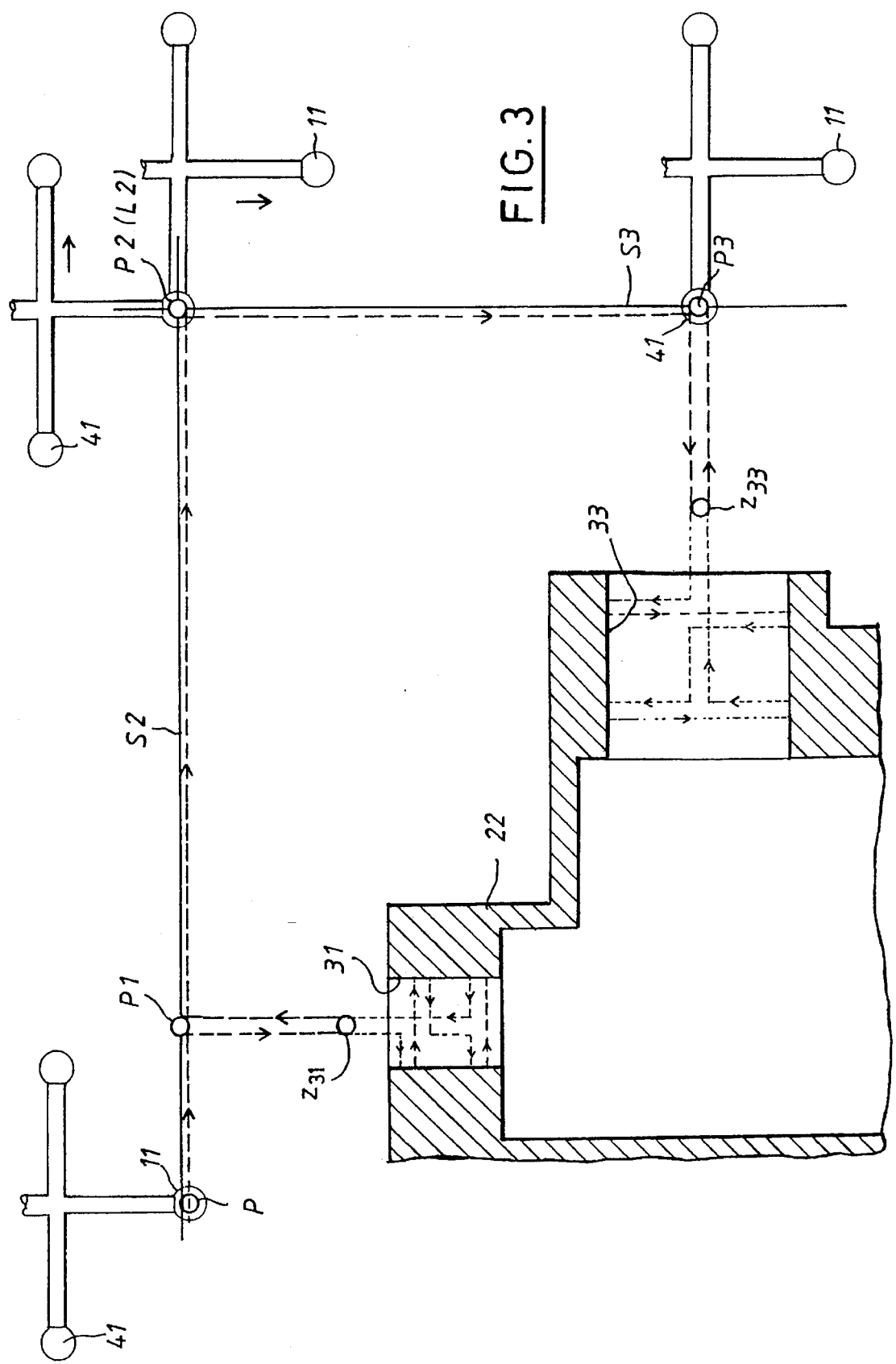
FIG. 3 presents, by way of example, a travel path of the probe in a section taken through a portion of the workpiece of FIG. 1.

In FIG. 3, the path is explained in detail which the probe 25 traverses in the context of the measuring task "measure the angle between the axes of the bores 31 and 33".

For this purpose, it can be assumed that the probe 25 is located in a park position P on the safety-reference surface S2 before the start of the measuring task so that the probe ball 11 at the lower end of the probe 25 lies on the safety-reference surface S2; that is, the probe ball lies closest to the safety-reference surface S2 and is to be used for making measurements on the workpiece surface. It should furthermore be mentioned that each geometric element has assigned to it an intermediate position. These intermediate positions can be points from which the particular probe ball travels over standardized contact paths in the context of macros defined for a geometric element such as a cylinder, circle or surface. The intermediate positions are advantageously placed shortly forward of or over the geometric element to be measured. These are the intermediate positions Z31 and Z33 for the geometric elements 31 and 33, that is, for the two cylindrical bores.

For the above-mentioned measuring task, the control module automatically first computes a shortest path on the safety-reference surface S2 to a point which lies perpendicularly above the intermediate position Z31. This is the point P1. Starting at this point, the probe ball 11 then moves into the enclosing parallelepiped defined by the safety-reference surfaces and travels to the intermediate position Z31. From there, the geometric macro "measure cylinder" is executed. The probe ball 11 moves along the path (finely dotted lines) into the interior of the bore 31 and contacts the walls of the bore in two planes at at least four locations and then moves back again to the intermediate position Z31.

The next element to be measured in the context of the measuring task, namely the bore 33, lies on another side of the workpiece and is assigned to the safety-reference surface S3. Because in this case there is a changeover to another safety-reference surface, the probe 25 moves with the probe ball 11 from the intermediate position Z31 back to point P1 on the safety-reference surface S2 and travels from there perpendicularly to the intersect line L2 on the safety-reference surface S3. The probe moves beyond the intersect line L2 until the probe ball 41 lies in the safety-reference surface S3 because the probe ball 41 is the probe element adjacent the workpiece with respect to this side of the workpiece. From there, the program computes the shortest path to a position P3 and moves the probe ball 41 into this position. The position P3 lies on the safety-reference surface S3 perpendicularly spaced from the intermediate position Z33 for the geometric element 33. From there, the geometric macro "measure cylinder" is executed as described with respect to the cylinder bore 31. In this geometric macro, the inner surface of the bore 33 is contacted. Thereafter, the probe returns to the intermediate position Z33. The probe then returns to point P3 on the safety-reference surface S3 because no further geometric elements are to be measured on this side of the workpiece.

A disturbance can occur, for example, in that the probe ball already comes into contact engagement with the surface of the workpiece before reaching the intermediate position Z31, for example, because the workpiece had not been machined at that location or is covered by a holder device. If this disturbance now occurs in the measuring sequence described, then this collision is detected by the control electronics 1 and a fault announcement is emitted. A fault handling module is called up in the control software based on this fault announcement and interrupts the automatic measuring sequence and continues the sequence in a changed form. This fault handling module is coupled to the control module which automatically generates the travel path.

Figure 5:
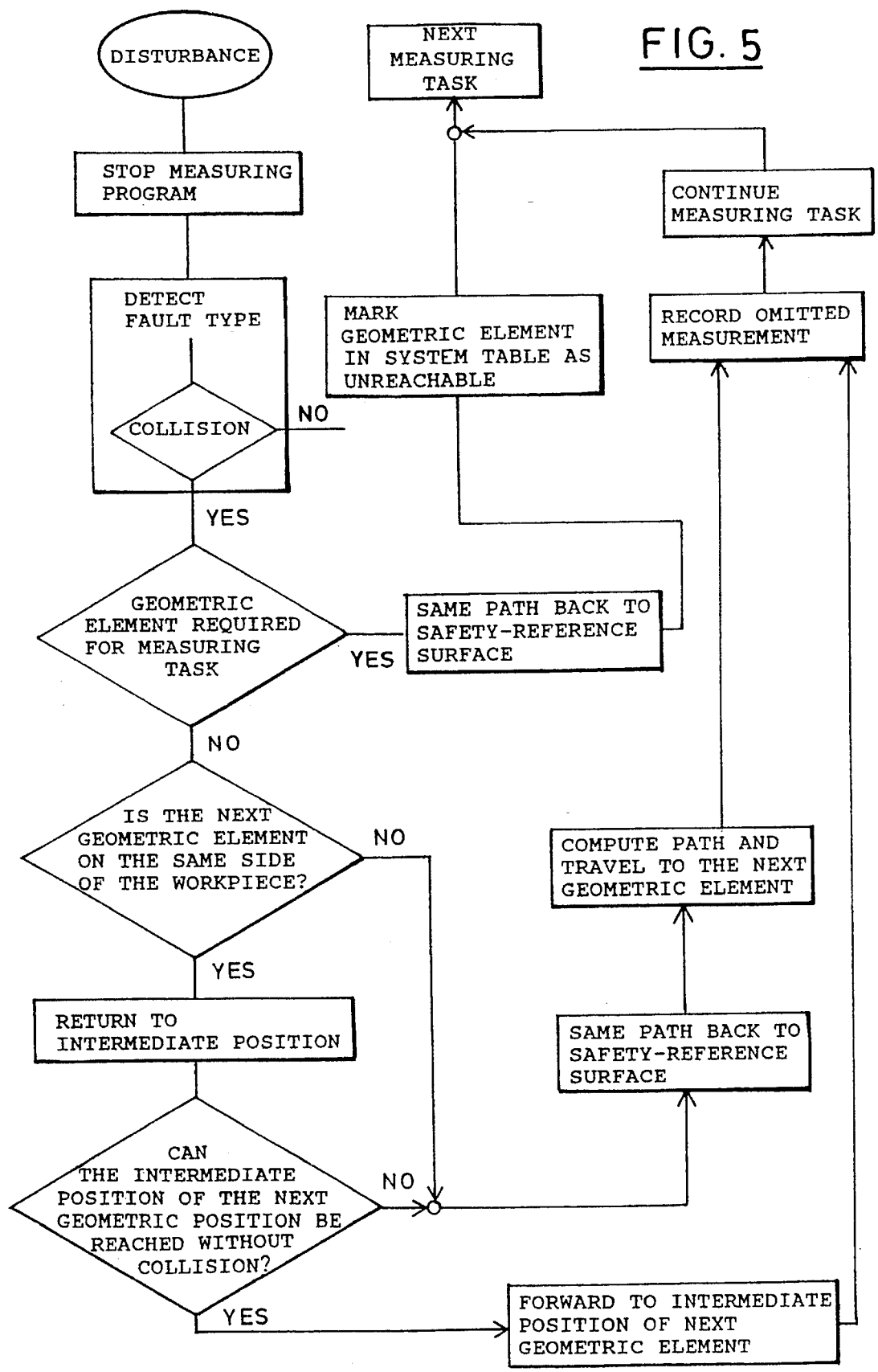

The fault handling module first determines whether the measuring task can be solved by movement to and measurement of the geometric elements remaining. If this is the case, then the control module is activated and the probe head or probe ball is subsequently automatically moved to the safety-reference surface S2. From there, the control module automatically computes and generates a new path on or along the safety-reference surfaces S2 and S3 to the next geometric element to be measured, that is, to bore 33; or, in the event that the measuring task can no longer be performed, the control module computes a new path to bore 34 which is the first element to be approached in the context of the next measuring task. This operation is executed after activating the corresponding software module by the fault announcement in accordance with a fixed routine for which the flowchart is shown in FIG. 5.

If a collision occurs while measuring the geometric element, that is, within the bore 31, the probe ball travels on the path, which was previously traversed from the intermediate position Z31, back to intermediate position Z31 and then, from there, to the safety-reference surface S2 without again contacting the inner wall of the bore. In lieu thereof, it is however also possible, and especially time saving for measuring tasks which provide for a great many contacts in one geometric element (for testing form), when the probe attempts to return to the intermediate position via a direct path within the macro (when there is a collision or no contact surface) without again moving through the contact positions which have already been processed.

If, for the next measuring task, another probe is to be used, the control module moves the probe head 10 on the safety-reference surface S2 to one of the positions identified by P22 to P25 perpendicularly above a change position (W2 to W5) which lies next to a free magazine location. The position and the shortest path to the position (P22 to P25) concerned are computed automatically by the control module. From the change position W2, a movement sequence, which is the same for all magazine locations, takes place wherein the probe head 10 travels into the free magazine location on which the probe 25 is to be parked. Thereafter, the probe head 10 is moved back to change position W2 and from there to the next change position W1 in front of the magazine location from which the new probe 26 is to be taken.

With this description, the assumption is made that the safety-reference surface S2 extends up to the magazine 23 and the possibility of a collision-free travel path is provided even in those cases in which the workpiece table 21 is loaded with an entire row of additional workpieces to be measured. In other cases, when the space between the safety-reference surface S1 and the magazine 23 is clear, the magazine can also be directly reached from the safety-reference surfaces S1, S4 and S5 without a detour via the safety-reference surface S2.

Figure 4:
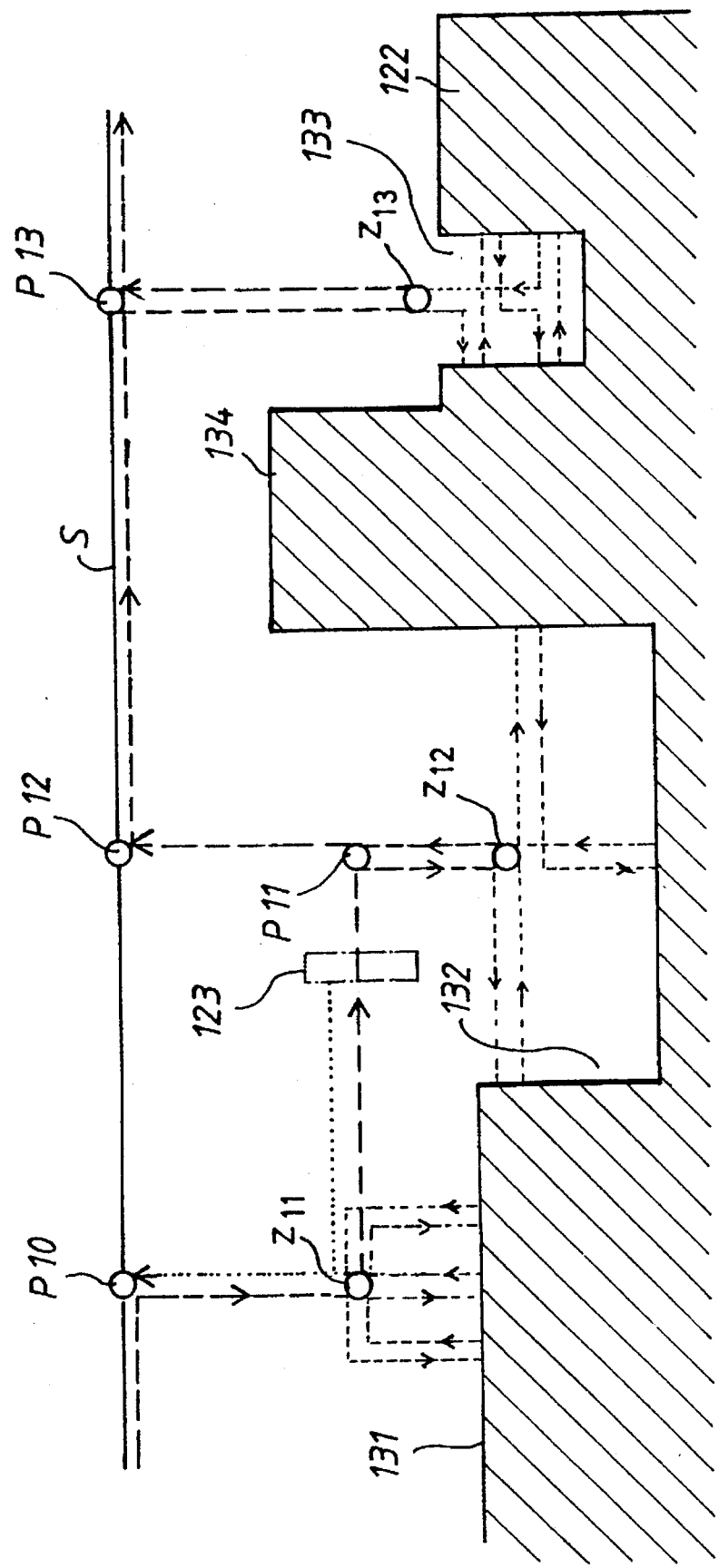
FIG. 4 shows the travel path of the probe in a section through another workpiece; and, FIG. 5 is a simplified flowchart showing the control program according to the invention.

In the embodiments of FIGS. 2 and 3, the assumption was made that the travel path was via the safety-reference surfaces S2 and S3 for the change from the intermediate position Z31 of the geometric element 31 to the intermediate position Z33 of the next geometric element 33. This is so because the two geometric elements 31 and 33 lie on different sides of the workpiece. If several geometric elements are to be measured one next to the other on one side of the workpiece, then this is not necessarily required. The corresponding case is shown in FIG. 4. There, the following are to be measured sequentially: the surface 131, the lower-lying recess 132 and finally a bore 133 lying behind the raised portion 134. The safety-reference surface defined for this side of the workpiece is identified by S.

For executing this measuring task, the probe with the probe ball utilized therefor moves on the safety-reference surface S to an automatically-computed point P10 which lies (referred to the safety-reference surface S) perpendicularly above the intermediate position Z11 for the surface 131 to be measured. Thereafter, the macro, which is defined for the surface measurement, is executed wherein the surface 131 is contacted several times. After the measurement on the geometric element 131 is ended, the probe should move to tile intermediate position Z12 for the element 132.

This intermediate position Z12 can be reached without collision. For this reason, the control module computes a more direct path to a position P11 on the perpendicular connecting line between the safety-reference surface S and the intermediate position Z12 without returning to safety-reference surface S. From there, the intermediate position Z12 is approached and, thereafter, the corresponding geometric macro for measuring the geometric element 132 is called up.

After processing the geometric element 132, the intermediate position Z13 of the geometric element 133 must be reached. However, this position Z13 cannot be reached without collision because the elevated portion 134 of the workpiece separates the two intermediate positions Z12 and Z13. The control module therefore selects the path via the safety-reference surface S and travels from tile intermediate position Z12 to a point P12 lying perpendicularly thereabove on the safety-reference surface S and from there travels along the shortest path to the position P13 lying perpendicularly above the intermediate position Z13. The location of position P13 is likewise computed automatically and, thereafter, the control module performs the geometric macro "measure cylinder" on the bore 133.

In this way, the travel paths between geometric elements on the same side of the workpiece are substantially optimized.

If a disturbance occurs (for example, a collision on the path between the intermediate positions Z11 and Z12 as symbolized by the hindrance 123 shown in phantom outline in FIG. 4), then the safety-reference surface S is again approached via the intermediate position Z11 lying in front of this plane and the program there attempts to move from the position P10 to the next geometric element to be measured via the safety-reference surface S.

Attention is again called to the fact that the operator does not have to program positions on any location on the safety-reference surfaces because the positions and the travel paths on these surfaces are generated automatically by a module of the control program. This applies also for the positions P1, P2, P3, P10, P12, P13 and P21 to P25 in the embodiments described. These positions are all computed automatically by the control program.

It is also possible to define or program a fixed path for the connection between geometric elements or their intermediate positions which the probe must follow. This is especially advantageous when the geometric elements concerned are located at angled locations in the interior of a workpiece and the placement of safety-reference surfaces at the locations is more complex than inserting a fixed path or when the intermediate position of a geometric element cannot be reached without collision from the safety-reference surface.

In this embodiment, the safety-reference surfaces (S1 to S5) are shown as planes which surround the workpiece in a form of a box and are mutually perpendicular. However, it is also possible, and especially for appropriate workpiece geometries, to position the safety-reference surfaces, for example, as a cylindrical surface about the workpiece, or to dimension the surfaces to follow the form of the workpiece or to place the surfaces in the interior of hollow workpieces. What is here essential is that the probe can be moved without collision on the defined safety-reference surfaces.

Likewise, it is possible not to use the entire intersect line of the planes for the transition from one safety-reference plane to the next, but to provide connecting points to which the probe must travel.

It is furthermore possible to block specific intersect lines for the transition from one safety-reference surface to the next if, for example, hindrances project into the measuring region at the location. Otherwise, the control module computes the length of all three possible detour paths via one of the three safety-reference surfaces S2, S4 or S5 and thereafter selects the shortest thereof. This is the case, for example, when travel is intended from an element below the safety-reference surface S3 to an element below the safety-reference surface S1.

It is understood that the foregoing description is that of the preferred embodiments of the invention and that various changes and modifications may be made thereto without departing from the spirit and scope of the invention as defined in the appended claims.

What is claimed is:

1. A method of controlling a coordinate measuring apparatus for making measurements on a workpiece utilizing a probe, the workpiece having a plurality of geometric elements on first and second sides thereof and the apparatus having a fault-handling device for interrupting a measuring sequence in the case of a disturbance and for resuming the measurement sequence in a modified form, the method comprising the steps of:

coupling a control module to said fault-handling device;

placing predefined safety-reference surfaces about the workpiece;

automatically generating a travel path with said control module for said probe between said geometric elements utilizing said safety-reference surfaces; and, at least always automatically computing in said control module collision-free connecting paths on said safety-reference surfaces from one geometric element on said first side to a next one of said geometric elements when said next geometric element is on said second side of said workpiece.

2. The method of claim 1, further comprising the step of defining connecting lines or connecting points via which said control module provides a travel path for said probe for a transfer from one safety-reference surface to a next safety-reference surface.

3. The method of claim 2, wherein said safety-reference surfaces intersect to define a plurality of intersect lines and said connecting lines correspond to respective ones of said intersect lines.

4. The method of claim 3, further comprising the steps of:

defining a contact position for each one of said geometric elements at which said probe contacts said one geometric element; and, assigning an intermediate position to each one of said geometric elements which lies on a segment of said travel path between a corresponding safety-reference surface and the contact position.

5. The method of claim 4, in the event of a collision during a measurement on one of said geometric elements, the method further comprising the step of utilizing said control module to move said probe back along said path, which was pretravelled to reach said one geometric element, up to the last intermediate position (Z31 or Z11) and from there to the safety-reference surface (S2) or, without a detour, to move said probe via a safety-reference surface (S) directly to the intermediate position (Z12) of the next geometric element (132) lying on the same side of the workpiece.

6. The method of claim 1, further comprising the steps of:

interactively generating said safety-reference surfaces by placing said surfaces program controlled in correspondence to the dimensions of said workpiece so that each plane is at a minimum distance away from said workpiece; and, then displaying the safety-reference surfaces to an operator.

7. The method of claim 1, wherein said safety-reference surfaces are respective planes.

* * * * *